United States Patent
Liu et al.

(10) Patent No.: US 10,972,356 B2
(45) Date of Patent: Apr. 6, 2021

(54) METHOD FOR SELECTING NEGOTIATION COUNTERPART, METHOD FOR RESPONDING TO DISCOVERY MESSAGE, AND RELATED APPARATUS

(71) Applicant: Huawei Technologies Co., Ltd., Shenzhen (CN)

(72) Inventors: Bing Liu, Beijing (CN); Sheng Jiang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 89 days.

(21) Appl. No.: 15/963,692

(22) Filed: Apr. 26, 2018

(65) Prior Publication Data
US 2018/0248765 A1   Aug. 30, 2018

Related U.S. Application Data

(63) Continuation of application No. PCT/CN2015/092824, filed on Oct. 26, 2015.

(51) Int. Cl.
  *H04L 12/24* (2006.01)
  *H04L 29/08* (2006.01)
  *H04W 72/04* (2009.01)

(52) U.S. Cl.
  CPC ............ *H04L 41/12* (2013.01); *H04L 67/303* (2013.01); *H04W 72/046* (2013.01)

(58) Field of Classification Search
  CPC ..... H04L 41/12; H04L 67/303; H04W 72/046
  See application file for complete search history.

(56) References Cited

U.S. PATENT DOCUMENTS

| 6,604,142 B1 * | 8/2003 | Bertrand ........... H04L 29/06027 370/230 |
| 7,512,649 B2 | 3/2009 | Faybishenko et al. |

(Continued)

FOREIGN PATENT DOCUMENTS

| CN | 1951067 A | 4/2007 |
| CN | 101478755 A | 7/2009 |

(Continued)

OTHER PUBLICATIONS

"Procedures and mechanism for L3-based UE-to-network relay discovery," 3GPP TSG RAN WG1 Meeting #81, Fukuoka, Japan, R1-152669, 3rd Generation Partnership Project, Valbonne, France (May 25-29, 2015).

(Continued)

*Primary Examiner* — Philip J Chea
*Assistant Examiner* — Robert B McAdams
(74) *Attorney, Agent, or Firm* — Leydig, Voit & Mayer, Ltd.

(57) ABSTRACT

Embodiments of the present invention provide a method for selecting a negotiation counterpart. Specifically, the first device sends a discovery message in the network, and the discovery message includes a technical objective. The first device receives a first response message with which a second device replies, and receives a second response message with which a third device replies. The first response message carries information about a characteristic that is of the second device and that supports implementation of the technical objective, and the second response message carries information about a characteristic that is of the third device and that supports implementation of the technical objective. The first device can select a device with a higher technical objective support degree from the second device and the (Continued)

third device as the negotiation counterpart according to the first response message and the second response message.

20 Claims, 5 Drawing Sheets

(56) References Cited

U.S. PATENT DOCUMENTS

| | | | | |
|---|---|---|---|---|
| 7,602,756 | B2* | 10/2009 | Gu | H04L 12/2805 370/338 |
| 2004/0064575 | A1* | 4/2004 | Rasheed | H04L 69/329 709/232 |
| 2005/0193106 | A1 | 9/2005 | Desai et al. | |
| 2006/0120302 | A1* | 6/2006 | Poncini | H04W 24/00 370/254 |
| 2008/0013556 | A1* | 1/2008 | Kaippallimalil | H04W 8/065 370/401 |
| 2009/0276520 | A1* | 11/2009 | Weerakoon | H04L 67/101 709/224 |
| 2012/0005354 | A1 | 1/2012 | Cheng et al. | |
| 2013/0166759 | A1 | 6/2013 | Rajamani et al. | |
| 2014/0325021 | A1* | 10/2014 | Jenkins | H04L 67/14 709/217 |
| 2015/0142986 | A1 | 5/2015 | Reznik et al. | |
| 2016/0142496 | A1 | 5/2016 | Wang et al. | |
| 2016/0301736 | A1* | 10/2016 | Cesena, Jr. | H04L 67/20 |
| 2016/0330107 | A1* | 11/2016 | Thubert | H04L 45/22 |
| 2017/0223371 | A1 | 8/2017 | Li et al. | |

FOREIGN PATENT DOCUMENTS

| | | |
|---|---|---|
| CN | 101594693 A | 12/2009 |
| CN | 101686173 A | 3/2010 |
| CN | 101932083 A | 12/2010 |
| CN | 103401751 A | 11/2013 |
| CN | 104093028 A | 10/2014 |
| CN | 104283743 A | 1/2015 |
| JP | 2015503859 A | 2/2015 |
| WO | 2015015234 A1 | 2/2015 |
| WO | 2015152797 A1 | 10/2015 |

OTHER PUBLICATIONS

Bormann et al., "A Generic Autonomic Signaling Protocol (GRASP), draft-ietf-anima-grasp-01" pp. 1-51, Network Working Group (Oct. 9, 2015).
EP/15906883.2-1215, Office Action, dated Jun. 16, 2020.
Droms "Dynamic Host Configuration Protocol", Network Working Group, Request for Comments: 2131, Obsoletes: 1541, Category: Standards Track, IETF Trust, (Mar. 1997).
Droms et al., "Dynamic Host Configuration Protocol for IPv6 (DHCPv6)," Network Working Group, Request for Comments: 3315, Category: Standards Track, (Jul. 2003).
Mahy et al.,"Traversal Using Relays around NAT (TURN): Relay Extensions to Session Traversal Utilities for NAT (STUN)," Internet Engineering Task Force (IETF), Request for Comments: 5766 Category: Standards Track, ISSN: 2070-1721, IETF, (Apr. 2010).
"Internet Protocol DARPA Internet Program Protocol Specification," RFC791, Information Sciences Institute, University of Southern California (Sep. 1981).
Deering et al., "Internet Protocol, Version 6 (IPv6) Specification," Network Working Group, Request for Comments: 2460, Obsoletes: 1883, Category: Standards Track, The Internet Society (Dec. 1998).
Carpenter et al.,"A Generic Discovery and Negotiation Protocol for Autonomic Networking draft-carpenter-anima-gdn-protocol-00," Network Working Group, Internet-Draft, Huawei Technologies Co., Ltd, (Oct. 13, 2014).
Patil et al.,"Traversal Using Relays around NAT (TURN) Server Selection draft-patil-tram-turn-serv-selection-00", TRAM Internet-Draft, Intended Status: Informational, IETF (Oct. 26, 2014).
Carpenter et al.,"A Generic Autonomic Signaling Protocol (GRASP) draft-ietf-anima-grasp-00," Network Working Group Internet-Draft, Huawei Technologies Co., (Aug. 14, 2015).
CN/201580006810, Notice of Allowance, dated Aug. 28, 2020.

* cited by examiner

METHOD FOR SELECTING NEGOTIATION COUNTERPART, METHOD FOR RESPONDING TO DISCOVERY MESSAGE, AND RELATED APPARATUS

CROSS-REFERENCE TO RELATED APPLICATIONS

This application is a continuation of International Application No. PCT/CN2015/092824, filed on Oct. 26, 2015, the disclosure of which is hereby incorporated by reference in its entirety.

TECHNICAL FIELD

The present invention relates to the communications field, and in particular, to a method for selecting a negotiation counterpart, a method for responding to a discovery message, and a related apparatus.

BACKGROUND

A success of the Internet results in an increasingly large and complex network based on an Internet Protocol (IP). Therefore, a network automation requirement is ever-increasing. To implement autonomy, a network device needs to discover another network device as required and perform negotiation. Before negotiating with another network device, a first device in a network needs to find a negotiation counterpart by using the following process. The first device sends a discovery message to the another device in the network, to initiate a discovery process. The discovery message includes a technical objective corresponding to the initiated discovery process. The technical objective is used to indicate a purpose of initiating the discovery process by the first device. The discovery message is used to find a device supporting the technical objective in the network.

For example, if a second device determines that the second device supports the technical objective, the second device may reply to the first device with a response message, to notify the first device that the second device supports the technical objective. If the second device determines that a third device supports the technical objective, the second device may also reply to the first device with a response message, to notify the first device that the third device supports the technical objective. In this case, the response message may include a locator option field. The locator option field carries identification information of the third device. The first device may determine, according to the received response message, a device supporting the technical objective in the network. In a practical application, one or at least two devices supporting the technical objective may exist in the network. When at least two devices supporting the technical objective exist in the network, the first device selects one device from the devices supporting the technical objective as the negotiation counterpart, and then establishes a negotiation process. In the prior art, the first device may use a random policy to randomly select one device from the devices supporting the technical objective as the negotiation counterpart. Alternatively, the first device may use a fixed policy to select the negotiation counterpart from the devices supporting the technical objective, for example, to select a device closest to the first device, or a device that supports the technical objective and is corresponding to a response message that is first received by the first device.

The discovery message includes multiple types of technical objectives, for example, "reserving a bandwidth", "finding an address resource", and "establishing a virtual private network (VPN) tunnel". Different technical objectives impose different requirements on the negotiation counterpart. For example, for a technical objective of "reserving a bandwidth", a device that can provide a higher available bandwidth is more suitable to act as the negotiation counterpart. For a technical objective of "finding an address resource", a device that provides a longer consecutive address segment is more suitable to act as the negotiation counterpart. For a technical objective of "establishing a VPN tunnel", a device with a larger forwarding capacity is more suitable to act as the negotiation counterpart. However, in the prior art, using the random policy or the fixed policy to select the negotiation counterpart cannot ensure that the first device can select a relatively suitable negotiation counterpart. If a selected negotiation counterpart is not suitable, it cannot be ensured that an ideal negotiation effect can be obtained when the first device performs a subsequent negotiation operation with the negotiation counterpart.

SUMMARY

Embodiments of the present invention provide a method for selecting a negotiation counterpart, so that a first device can select a relatively suitable negotiation counterpart.

A first aspect of embodiments of present invention provides a method for selecting a negotiation counterpart, including:

sending, by a first device, a discovery message to at least two devices in a network, where the discovery message includes a technical objective, and the discovery message is used to find a device supporting the technical objective;

receiving, by the first device, a first response message that is sent by a second device and is used to respond to the discovery message, where the first response message includes information about a characteristic that is of the second device and that supports implementation of the technical objective;

receiving, by the first device, a second response message that is sent by a third device and is used to respond to the discovery message, where the second response message includes information about a characteristic that is of the third device and that supports implementation of the technical objective; and selecting, by the first device, a device matching the technical objective from the second device and the third device as a negotiation counterpart according to the information about the characteristic that is of the second device and that supports implementation of the technical objective and the information about the characteristic that is of the third device and that supports implementation of the technical objective.

With reference to the first aspect of embodiments of the present invention, in a first implementation of the first aspect of embodiments of the present invention, before the sending, by a first device, a discovery message to at least two devices in a network, the method further includes: determining, by the first device, a characteristic supporting implementation of the technical objective; and the discovery message further includes the characteristic supporting implementation of the technical objective.

With reference to the first implementation of the first aspect of embodiments of the present invention, in a second implementation of the first aspect of embodiments of the present invention, a correspondence between the technical objective and the characteristic supporting implementation of the technical objective is preset in the first device, and the determining, by the first device, a characteristic supporting implementation of the technical objective includes: determining, by the first device according to the preset correspondence between the technical objective and the characteristic supporting implementation of the technical objective, the characteristic supporting implementation of the technical objective.

With reference to the first implementation of the first aspect of embodiments of the present invention, in a third implementation of the first aspect of embodiments of the present invention, before the determining, by the first device, a characteristic supporting implementation of the technical objective, the method further includes:

receiving, by the first device, a notification message, where the notification message carries the characteristic supporting implementation of the technical objective; and the determining, by the first device, a characteristic supporting implementation of the technical objective includes: obtaining, by the first device, the characteristic supporting implementation of the technical objective from the notification message.

With reference to any one of the first aspect, or the first to the third implementations of the first aspect of embodiments of the present invention, in a fourth implementation of the first aspect of embodiments of the present invention, after the sending, by a first device, a discovery message to at least two devices in a network, the method further includes:

receiving, by the first device, a third response message that is sent by a fourth device and is used to respond to the discovery message, where the third response message includes information about a characteristic that is of a fifth device and that supports implementation of the technical objective, and the information is stored in the fourth device; and the selecting, by the first device, a device matching the technical objective from the second device and the third device as a negotiation counterpart according to the information about the characteristic that is of the second device and that supports implementation of the technical objective and the information about the characteristic that is of the third device and that supports implementation of the technical objective includes:

selecting, by the first device, a device matching the technical objective from the second device, the third device, and the fifth device as the negotiation counterpart according to the information about the characteristic that is of the second device and that supports implementation of the technical objective, the information about the characteristic that is of the third device and that supports implementation of the technical objective, and the information about the characteristic that is of the fifth device and that supports implementation of the technical objective.

With reference to any one of the first aspect, or the first to the fourth implementations of the first aspect of embodiments of the present invention, in a fifth implementation of the first aspect of embodiments of the present invention, the discovery message includes a first option, a first field of the first option is used to carry a type of the first option that is a technical objective type, a second field of the first option is used to carry a length of the first option, and a third field of the first option is used to carry the technical objective.

With reference to any one of the first aspect, or the first to the fourth implementations of the first aspect of embodiments of the present invention, in a sixth implementation of the first aspect of embodiments of the present invention, the discovery message includes a first option, a first field of the first option is used to carry a type of the first option that is a characteristic type, a second field of the first option is used to carry a length of the first option, a third field of the first option is used to carry the technical objective, and a fourth field of the first option is used to carry the characteristic supporting implementation of the technical objective.

With reference to any one of the first aspect, or the first to the sixth implementations of the first aspect of embodiments of the present invention, in a seventh implementation of the first aspect of embodiments of the present invention, the first response message includes a second option, a first field of the second option is used to carry a type of the second option that is a characteristic information type, a second field of the second option is used to carry a length of the second option, a third field of the second option is used to carry the technical objective, and a fourth field of the second option is used to carry the information about the characteristic that is of the second device and that supports implementation of the technical objective; and the second response message includes a third option, a first field of the third option is used to carry a type of the third option that is a characteristic information type, a second field of the third option is used to carry a length of the third option, a third field of the third option is used to carry the technical objective, and a fourth field of the third option is used to carry the information about the characteristic that is of the third device and that supports implementation of the technical objective.

With reference to any one of the first aspect, or the first to the seventh implementations of the first aspect of embodiments of the present invention, in an eighth implementation of the first aspect of embodiments of the present invention, the third response message includes a fourth option, a first field of the fourth option is used to carry a type of the fourth option that is a divert type, a second field of the fourth option is used to carry a length of the fourth option, a third field of the fourth option is used to carry the technical objective, and a fourth field of the fourth option is used to carry the information about the characteristic that is of the fifth device and that supports implementation of the technical objective; and the fourth option further includes a fifth field, used to carry identification information of the fifth device.

A second aspect of embodiments of the present invention provides a method for responding to a discovery message, including:

receiving, by a second device, a discovery message sent by a first device, where the discovery message includes a technical objective, and the discovery message is used to find a device supporting the technical objective;

if the second device supports the technical objective, determining, by the second device, a characteristic supporting implementation of the technical objective, and information about the characteristic; and sending, by the second device to the first device, a response message that is used to respond to the discovery message, where the response message includes information about a characteristic that is of the second device and that supports implementation of the technical objective.

With reference to the second aspect of embodiments of the present invention, in a first implementation of the second aspect of embodiments of the present invention, a correspondence between the technical objective and the characteristic supporting implementation of the technical objective is preset in the second device, and the determining, by the second device, a characteristic supporting implementation of the technical objective includes: determining, by the second device according to the correspondence between the technical objective and the characteristic supporting implementation of the technical objective, the characteristic supporting implementation of the technical objective.

With reference to the second aspect of embodiments of the present invention, in a second implementation of the second aspect of embodiments of the present invention, before the determining, by the second device, a characteristic supporting implementation of the technical objective, the method further includes: receiving, by the second device, a notification message, where the notification message carries the characteristic supporting implementation of the technical objective; and the determining, by the second device, a characteristic supporting implementation of the technical objective includes: obtaining, by the second device, the characteristic supporting implementation of the technical objective from the notification message.

With reference to the second aspect of embodiments of the present invention, in a third implementation of the second aspect of embodiments of the present invention, the discovery message further includes the characteristic supporting implementation of the technical objective, and the determining, by the second device, a characteristic supporting implementation of the technical objective includes: obtaining, by the second device, the characteristic supporting implementation of the technical objective from the discovery message.

With reference to the second or the third implementation of the second aspect of embodiments of the present invention, in a fourth implementation of the second aspect of embodiments of the present invention, after the determining, by the second device, a characteristic supporting implementation of the technical objective, the method further includes:

storing, by the second device, a correspondence between the technical objective and the characteristic supporting implementation of the technical objective.

With reference to any one of the second aspect, or the first to the fourth implementations of the second aspect of embodiments of the present invention, in a fifth implementation of the second aspect of embodiments of the present invention, the method further includes:

if information about a characteristic that is of a third device and that supports implementation of the technical objective is stored in the second device, the response message includes the information about the characteristic that is of the third device and that supports implementation of the technical objective, where the information is stored in the second device.

With reference to any one of the second aspect, or the first to the fifth implementations of the second aspect of embodiments of the present invention, in a sixth implementation of the second aspect of embodiments of the present invention, the discovery message includes a first option, a first field of the first option is used to carry a type of the first option that is a technical objective type, a second field of the first option is used to carry a length of the first option, and a third field of the first option is used to carry the technical objective.

With reference to any one of the second aspect, or the first to the sixth implementations of the second aspect of embodiments of the present invention, in a seventh implementation of the second aspect of embodiments of the present invention, the discovery message includes a first option, a first field of the first option is used to carry a type of the first option that is a characteristic type, a second field of the first option is used to carry a length of the first option, a third field of the first option is used to carry the technical objective, and a fourth field of the first option is used to carry the characteristic supporting implementation of the technical objective.

With reference to any one of the second aspect, or the first to the seventh implementations of the second aspect of embodiments of the present invention, in an eighth implementation of the second aspect of embodiments of the present invention, the response message includes a second option, a first field of the second option is used to carry a type of the second option that is a characteristic information type, a second field of the second option is used to carry a length of the second option, a third field of the second option is used to carry the technical objective, and a fourth field of the second option is used to carry the information about the characteristic that is of the second device and that supports implementation of the technical objective.

With reference to any one of the second aspect, or the first to the eighth implementations of the second aspect of embodiments of the present invention, in a ninth implementation of the second aspect of embodiments of the present invention, the response message includes a third option, a first field of the third option is used to carry a type of the third option that is a divert type, a second field of the third option is used to carry a length of the third option, a third field of the third option is used to carry the technical objective, and a fourth field of the third option is used to carry the information about the characteristic that is of the third device and that supports implementation of the technical objective; and the third option further includes a fifth field, used to carry identification information of the third device.

A third aspect of embodiments of the present invention provides an apparatus for selecting a negotiation counterpart, where the apparatus acts as a first device in a network, and includes:

a message sending module, configured to send a discovery message to at least two devices in the network, where the discovery message includes a technical objective, and the discovery message is used to find a device supporting the technical objective;

a message receiving module, configured to receive a first response message that is sent by a second device and is used to respond to the discovery message, where the first response message includes information about a characteristic that is of the second device and that supports implementation of the technical objective, and the message receiving module is further configured to receive a second response message that is sent by a third device and is used to respond to the discovery message, where the second response message includes information about a characteristic that is of the third device and that supports implementation of the technical objective; and a counterpart selection module, configured to select a device matching the technical objective from the second device and the third device as a negotiation counterpart according to the information about the characteristic that is of the second device and that supports implementation of the technical objective and the information about the characteristic that is of the third device and that supports implementation of the technical objective.

With reference to the third aspect of embodiments of the present invention, in a first implementation of the third aspect of embodiments of the present invention, the apparatus further includes a characteristic determining module, configured to determine a characteristic supporting implementation of the technical objective; and the discovery message further includes the characteristic supporting implementation of the technical objective.

With reference to the first implementation of the third aspect of embodiments of the present invention, in a second implementation of the third aspect of embodiments of the present invention, a correspondence between the technical objective and the characteristic supporting implementation of the technical objective is preset in a memory of the apparatus, and the characteristic determining module is further configured to determine, according to the preset correspondence between the technical objective and the characteristic supporting implementation of the technical objective, the characteristic supporting implementation of the technical objective.

With reference to the first implementation of the third aspect of embodiments of the present invention, in a third implementation of the third aspect of embodiments of the present invention, the message receiving module is further configured to receive a notification message, where the notification message carries the characteristic supporting implementation of the technical objective; and the characteristic determining module is further configured to obtain the characteristic supporting implementation of the technical objective from the notification message.

With reference to any one of the third aspect, or the first to the third implementations of the third aspect of embodiments of the present invention, in a fourth implementation of the third aspect of embodiments of the present invention, the message receiving module is further configured to receive a third response message that is sent by a fourth device and is used to respond to the discovery message, where the third response message includes information about a characteristic that is of a fifth device and that supports implementation of the technical objective, and the information is stored in the fourth device; and the counterpart selection module is further configured to select a device matching the technical objective from the second device, the third device, and the fifth device as the negotiation counterpart according to the information about the characteristic that is of the second device and that supports implementation of the technical objective, the information about the characteristic that is of the third device and that supports implementation of the technical objective, and the information about the characteristic that is of the fifth device and that supports implementation of the technical objective.

With reference to any one of the third aspect, or the first to the fourth implementations of the third aspect of embodiments of the present invention, in a fifth implementation of the third aspect of embodiments of the present invention, the discovery message includes a first option, a first field of the first option is used to carry a type of the first option that is a technical objective type, a second field of the first option is used to carry a length of the first option, and a third field of the first option is used to carry the technical objective.

With reference to any one of the third aspect, or the first to the fourth implementations of the third aspect of embodiments of the present invention, in a sixth implementation of the third aspect of embodiments of the present invention, the discovery message includes a first option, a first field of the first option is used to carry a type of the first option that is a characteristic type, a second field of the first option is used to carry a length of the first option, a third field of the first option is used to carry the technical objective, and a fourth field of the first option is used to carry the characteristic supporting implementation of the technical objective.

With reference to any one of the third aspect, or the first to the sixth implementations of the third aspect of embodiments of the present invention, in a seventh implementation of the third aspect of embodiments of the present invention, the first response message includes a second option, a first field of the second option is used to carry a type of the second option that is a characteristic information type, a second field of the second option is used to carry a length of the second option, a third field of the second option is used to carry the technical objective, and a fourth field of the second option is used to carry the information about the characteristic that is of the second device and that supports implementation of the technical objective; and the second response message includes a third option, a first field of the third option is used to carry a type of the third option that is a characteristic information type, a second field of the third option is used to carry a length of the third option, a third field of the third option is used to carry the technical objective, and a fourth field of the third option is used to carry the information about the characteristic that is of the third device and that supports implementation of the technical objective.

With reference to any one of the third aspect, or the first to the seventh implementations of the third aspect of embodiments of the present invention, in an eighth implementation of the third aspect of embodiments of the present invention, the third response message includes a fourth option, a first field of the fourth option is used to carry a type of the fourth option that is a divert type, a second field of the fourth option is used to carry a length of the fourth option, a third field of the fourth option is used to carry the technical objective, and a fourth field of the fourth option is used to carry the information about the characteristic that is of the fifth device and that supports implementation of the technical objective; and the fourth option further includes a fifth field, used to carry identification information of the fifth device.

A fourth aspect of embodiments of the present invention provides an apparatus for responding to a discovery message, where the apparatus acts as a second device in a network, and includes:

a message receiving module, configured to receive a discovery message sent by a first device, where the discovery message includes a technical objective, and the discovery message is used to find a device supporting the technical objective;

an information determining module, configured to: when the second device supports the technical objective, determine a characteristic supporting implementation of the technical objective, and determine information about a characteristic that is of the second device and that supports implementation of the technical objective; and a message sending module, configured to send, to the first device, a response message that is used to respond to the discovery message, where the response message includes the information about the characteristic that is of the second device and that supports implementation of the technical objective.

With reference to the fourth aspect of embodiments of the present invention, in a first implementation of the fourth aspect of embodiments of the present invention, a correspondence between the technical objective and the characteristic supporting implementation of the technical objective is preset in a memory of the apparatus, and the information determining module is further configured to determine, according to the correspondence between the technical objective and the characteristic supporting implementation of the technical objective, the characteristic supporting implementation of the technical objective.

With reference to the fourth aspect of embodiments of the present invention, in a second implementation of the fourth aspect of embodiments of the present invention, the message receiving module is further configured to receive a notification message, where the notification message carries the characteristic supporting implementation of the technical objective; and the information determining module is further configured to obtain the characteristic supporting implementation of the technical objective from the notification message.

With reference to the fourth aspect of embodiments of the present invention, in a third implementation of the fourth aspect of embodiments of the present invention, the discovery message further includes the characteristic supporting implementation of the technical objective, and the information determining module is further configured to obtain the characteristic supporting implementation of the technical objective from the discovery message.

With reference to the second or the third implementation of the fourth aspect of embodiments of the present invention, in a fourth implementation of the fourth aspect of embodiments of the present invention, the apparatus further includes:

a relationship storage module, configured to store a correspondence between the technical objective and the characteristic supporting implementation of the technical objective.

With reference to any one of the fourth aspect, or the first to the fourth implementation of the fourth aspect of embodiments of the present invention, in a fifth implementation of the fourth aspect of embodiments of the present invention, the message sending module is further configured to:

if information about a characteristic that is of a third device and that supports implementation of the technical objective is stored in the second device, the response message includes the information about the characteristic that is of the third device and that supports implementation of the technical objective, where the information is stored in the second device.

With reference to any one of the fourth aspect, or the first to the fifth implementations of the fourth aspect of embodiments of the present invention, in a sixth implementation of the fourth aspect of embodiments of the present invention, the discovery message includes a first option, a first field of the first option is used to carry a type of the first option that is a technical objective type, a second field of the first option is used to carry a length of the first option, and a third field of the first option is used to carry the technical objective.

With reference to any one of the fourth aspect, or the first to the sixth implementations of the fourth aspect of embodiments of the present invention, in a seventh implementation of the fourth aspect of embodiments of the present invention, the discovery message includes a first option, a first field of the first option is used to carry a type of the first option that is a characteristic type, a second field of the first option is used to carry a length of the first option, a third field of the first option is used to carry the technical objective, and a fourth field of the first option is used to carry the characteristic supporting implementation of the technical objective.

With reference to any one of the fourth aspect, or the first to the seventh implementations of the fourth aspect of embodiments of the present invention, in an eighth implementation of the fourth aspect of embodiments of the present invention, the response message includes a second option, a first field of the second option is used to carry a type of the second option that is a characteristic information type, a second field of the second option is used to carry a length of the second option, a third field of the second option is used to carry the technical objective, and a fourth field of the second option is used to carry the information about the characteristic that is of the second device and that supports implementation of the technical objective.

With reference to any one of the fourth aspect, or the first to the eighth implementations of the fourth aspect of embodiments of the present invention, in a ninth implementation of the fourth aspect of embodiments of the present invention, the response message includes a third option, a first field of the third option is used to carry a type of the third option that is a divert type, a second field of the third option is used to carry a length of the third option, a third field of the third option is used to carry the technical objective, and a fourth field of the third option is used to carry the information about the characteristic that is of the third device and that supports implementation of the technical objective; and the third option further includes a fifth field, used to carry identification information of the third device.

A fifth aspect of embodiments of the present invention provides a device for selecting a negotiation counterpart, where the device acts as a first device in a network, and includes an input apparatus, an output apparatus, a processor, and a memory; the memory stores a computer-executable operation instruction; and when the operation instruction is being executed, the processor performs the following steps:

sending a discovery message to at least two devices in the network, where the discovery message includes a technical objective, and the discovery message is used to find a device supporting the technical objective;

receiving a first response message that is sent by a second device and is used to respond to the discovery message, where the first response message includes information about a characteristic that is of the second device and that supports implementation of the technical objective;

receiving a second response message that is sent by a third device and is used to respond to the discovery message, where the second response message includes information about a characteristic that is of the third device and that supports implementation of the technical objective; and selecting a device matching the technical objective from the second device and the third device as a negotiation counterpart according to the information about the characteristic that is of the second device and that supports implementation of the technical objective and the information about the characteristic that is of the third device and that supports implementation of the technical objective.

With reference to the fifth aspect of embodiments of the present invention, in a first implementation of the fifth aspect of embodiments of the present invention, the memory further includes a computer-executable instruction, used to determine a characteristic supporting implementation of the technical objective; and the discovery message further includes the characteristic supporting implementation of the technical objective.

With reference to the first implementation of the fifth aspect of embodiments of the present invention, in a second implementation of the fifth aspect of embodiments of the present invention, a correspondence between the technical objective and the characteristic supporting implementation of the technical objective is preset in the memory, and the memory further includes a computer-executable instruction, used to determine, according to the preset correspondence between the technical objective and the characteristic supporting implementation of the technical objective, the characteristic supporting implementation of the technical objective.

With reference to the first implementation of the fifth aspect of embodiments of the present invention, in a third implementation of the fifth aspect of embodiments of the present invention, the memory further includes a computer-executable instruction, used to:

receive a notification message before the characteristic supporting implementation of the technical objective is determined, where the notification message carries the characteristic supporting implementation of the technical objective; and obtain the characteristic supporting implementation of the technical objective from the notification message.

With reference to any one of the fifth aspect, or the first to the third implementation of the fifth aspect of embodiments of the present invention, in a fourth implementation of the fifth aspect of embodiments of the present invention, the memory further includes a computer-executable instruction, used to:

after the discovery message is sent to the at least two devices in the network, receive a third response message that is sent by a fourth device and is used to respond to the discovery message, where the third response message includes information about a characteristic that is of a fifth device and that supports implementation of the technical objective, and the information is stored in the fourth device; and select a device matching the technical objective from the second device, the third device, and the fifth device as the negotiation counterpart according to the information about the characteristic that is of the second device and that supports implementation of the technical objective, the information about the characteristic that is of the third device and that supports implementation of the technical objective, and the information about the characteristic that is of the fifth device and that supports implementation of the technical objective.

With reference to any one of the fifth aspect, or the first to the fourth implementations of the fifth aspect of embodiments of the present invention, in a fifth implementation of the fifth aspect of embodiments of the present invention, the discovery message includes a first option, a first field of the first option is used to carry a type of the first option that is a technical objective type, a second field of the first option is used to carry a length of the first option, and a third field of the first option is used to carry the technical objective.

With reference to any one of the fifth aspect, or the first to the fourth implementations of the fifth aspect of embodiments of the present invention, in a sixth implementation of the fifth aspect of embodiments of the present invention, the discovery message includes a first option, a first field of the first option is used to carry a type of the first option that is a characteristic type, a second field of the first option is used to carry a length of the first option, a third field of the first option is used to carry the technical objective, and a fourth field of the first option is used to carry the characteristic supporting implementation of the technical objective.

With reference to any one of the fifth aspect, or the first to the sixth implementations of the fifth aspect of embodiments of the present invention, in a seventh implementation of the fifth aspect of embodiments of the present invention, the first response message includes a second option, a first field of the second option is used to carry a type of the second option that is a characteristic information type, a second field of the second option is used to carry a length of the second option, a third field of the second option is used to carry the technical objective, and a fourth field of the second option is used to carry the information about the characteristic that is of the second device and that supports implementation of the technical objective; and the second response message includes a third option, a first field of the third option is used to carry a type of the third option that is a characteristic information type, a second field of the third option is used to carry a length of the third option, a third field of the third option is used to carry the technical objective, and a fourth field of the third option is used to carry the information about the characteristic that is of the third device and that supports implementation of the technical objective.

With reference to any one of the fifth aspect, or the first to the seventh implementations of the fifth aspect of embodiments of the present invention, in an eighth implementation of the fifth aspect of embodiments of the present invention, the third response message includes a fourth option, a first field of the fourth option is used to carry a type of the fourth option that is a divert type, a second field of the fourth option is used to carry a length of the fourth option, a third field of the fourth option is used to carry the technical objective, and a fourth field of the fourth option is used to carry the information about the characteristic that is of the fifth device and that supports implementation of the technical objective; and the fourth option further includes a fifth field, used to carry identification information of the fifth device.

A sixth aspect of embodiments of the present invention provides a device for responding to a discovery message, where the device acts as a second device in a network, and includes an input apparatus, an output apparatus, a processor, and a memory; the memory stores a computer-executable operation instruction; and when the operation instruction is being executed, the processor performs the following steps:

receiving a discovery message sent by a first device, where the discovery message includes a technical objective, and the discovery message is used to find a device supporting the technical objective;

if the second device supports the technical objective, determining a characteristic supporting implementation of the technical objective;

determining information about a characteristic that is of the second device and that supports implementation of the technical objective; and sending, to the first device, a response message that is used to respond to the discovery message, where the response message includes the information about the characteristic that is of the second device and that supports implementation of the technical objective.

With reference to the sixth aspect of embodiments of the present invention, in a first implementation of the sixth aspect of embodiments of the present invention, a correspondence between the technical objective and the characteristic supporting implementation of the technical objective is preset in the memory, and the memory further includes a computer-executable instruction, used to determine, according to the correspondence between the technical objective and the characteristic supporting implementation of the technical objective, the characteristic supporting implementation of the technical objective.

With reference to the sixth aspect of embodiments of the present invention, in a second implementation of the sixth aspect of embodiments of the present invention, the memory further includes a computer-executable instruction, used to:

receive a notification message before the characteristic supporting implementation of the technical objective is determined, where the notification message carries the characteristic supporting implementation of the technical objective; and obtain the characteristic supporting implementation of the technical objective from the notification message.

With reference to the sixth aspect of embodiments of the present invention, in a third implementation of the sixth aspect of embodiments of the present invention, the discovery message further includes the characteristic supporting implementation of the technical objective, and the memory further includes a computer-executable instruction, used to obtain the characteristic supporting implementation of the technical objective from the discovery message.

With reference to the second or the third implementation of the sixth aspect of embodiments of the present invention, in a fourth implementation of the sixth aspect of embodiments of the present invention, the memory further includes a computer-executable instruction, used to: after the characteristic supporting implementation of the technical objective is determined, store a correspondence between the technical objective and the characteristic supporting implementation of the technical objective.

With reference to any one of the sixth aspect, or the first to the fourth implementation of the sixth aspect of embodiments of the present invention, in a fifth implementation of the sixth aspect of embodiments of the present invention, the memory further includes a computer-executable instruction, used to:

if information about a characteristic that is of a third device and that supports implementation of the technical objective is stored in the second device, send, to the first device, a response message that is used to respond to the discovery message, where the response message includes the information about the characteristic that is of the third device and that supports implementation of the technical objective, and the information is stored in the second device.

With reference to any one of the sixth aspect, or the first to the fifth implementations of the sixth aspect of embodiments of the present invention, in a sixth implementation of the sixth aspect of embodiments of the present invention, the discovery message includes a first option, a first field of the first option is used to carry a type of the first option that is a technical objective type, a second field of the first option is used to carry a length of the first option, and a third field of the first option is used to carry the technical objective.

With reference to any one of the sixth aspect, or the first to the sixth implementations of the sixth aspect of embodiments of the present invention, in a seventh implementation of the sixth aspect of embodiments of the present invention, the discovery message includes a first option, a first field of the first option is used to carry a type of the first option that is a characteristic type, a second field of the first option is used to carry a length of the first option, a third field of the first option is used to carry the technical objective, and a fourth field of the first option is used to carry the characteristic supporting implementation of the technical objective.

With reference to any one of the sixth aspect, or the first to the seventh implementations of the sixth aspect of embodiments of the present invention, in an eighth implementation of the sixth aspect of embodiments of the present invention, the response message includes a second option, a first field of the second option is used to carry a type of the second option that is a characteristic information type, a second field of the second option is used to carry a length of the second option, a third field of the second option is used to carry the technical objective, and a fourth field of the second option is used to carry the information about the characteristic that is of the second device and that supports implementation of the technical objective.

With reference to any one of the sixth aspect, or the first to the eighth implementations of the sixth aspect of embodiments of the present invention, in a ninth implementation of the sixth aspect of embodiments of the present invention, the response message includes a third option, a first field of the third option is used to carry a type of the third option that is a divert type, a second field of the third option is used to carry a length of the third option, a third field of the third option is used to carry the technical objective, and a fourth field of the third option is used to carry the information about the characteristic that is of the third device and that supports implementation of the technical objective; and the third option further includes a fifth field, used to carry identification information of the third device.

Embodiments of the present invention provide the method for selecting a negotiation counterpart. The first device sends the discovery message to the at least two devices in the network, and the discovery message includes the technical objective. The first device receives the first response message sent by the second device, and the first response message includes the information about the characteristic that is of the second device and that supports implementation of the technical objective. The first device receives the second response message sent by the third device, and the response message includes the information about the characteristic supporting the technical objective. The first device selects the negotiation counterpart from the second device and the third device according to the information about the characteristic that is of the second device and that supports implementation of the technical objective and the information about the characteristic that is of the third device and that supports implementation of the technical objective. Different characteristics support implementation of different technical objectives, and information about a characteristic supporting implementation of a technical objective reflects a technical objective support degree of a device. Therefore, in embodiments of the present invention, the first device can select a device with a higher technical objective support degree from the second device and the third device as the negotiation counterpart according to the first response information and the second response information. Compared with a case in which a negotiation counterpart is selected randomly or by using a fixed policy in the prior art, in the method provided in embodiments of the present invention, a relatively suitable negotiation counterpart can be selected, so that an effect of negotiation between devices is ensured.

BRIEF DESCRIPTION OF DRAWINGS

FIG. 1(*c*) is a schematic structural diagram of an option structure;

DESCRIPTION OF EMBODIMENTS

Embodiments of the present invention provide a method for selecting a negotiation counterpart, so that a first device can select a relatively suitable negotiation counterpart, and an effect of negotiation between devices is ensured. Embodiments of the present invention further provide a related method for responding to a discovery message and a related apparatus. Detailed descriptions are separately given in the following.

The method provided in embodiments of the present invention may be applied to a network using a Generic Discovery and Negotiation Protocol (GRASP). The GRASP protocol is a new protocol proposed in the ANIMA (Anima) working group of the Internet Engineering Task Force (IETF). The protocol provides a general tool/platform for interaction between router devices. By using the GRASP, working such as discovery and parameter configuration may be autonomously completed between devices without human intervention, so that the device less depends on network management configuration. The method provided in embodiments of the present invention may also be applied to a network using another protocol. No limitation is imposed herein.

Before performing negotiation, a first device in a network needs to find a negotiation counterpart by using the following discovery process: The first device sends a discovery message to another device in the network, to initiate a discovery process. The discovery message includes a technical objective. The technical objective is used to indicate a purpose of initiating the discovery process by the first device. The discovery message is used to find a device supporting the technical objective in the network. For example, if the first device finds, by using the discovery process, an uplink device that can reserve a bandwidth for the first device, the technical objective in the discovery message may be "reserving a bandwidth", and a device that can provide a reserved bandwidth for the first device is the device supporting the technical objective. If the first device needs to establish a VPN tunnel, the technical objective may be "establishing a VPN tunnel", and a device that can establish a VPN tunnel with the first device is the device supporting the technical objective. After receiving the discovery message, if the another device in the network determines that the another device can support the technical objective in the discovery message, then the another device replies to the first device with a response message. In a practical application, multiple devices supporting the technical objective may exist in the network. Therefore, the first device may receive response messages sent by multiple devices. The first device selects, from the devices replying with the response messages, one device as the negotiation counterpart. After determining the negotiation counterpart, the first device may negotiate with the negotiation counterpart.

Figure 1A:
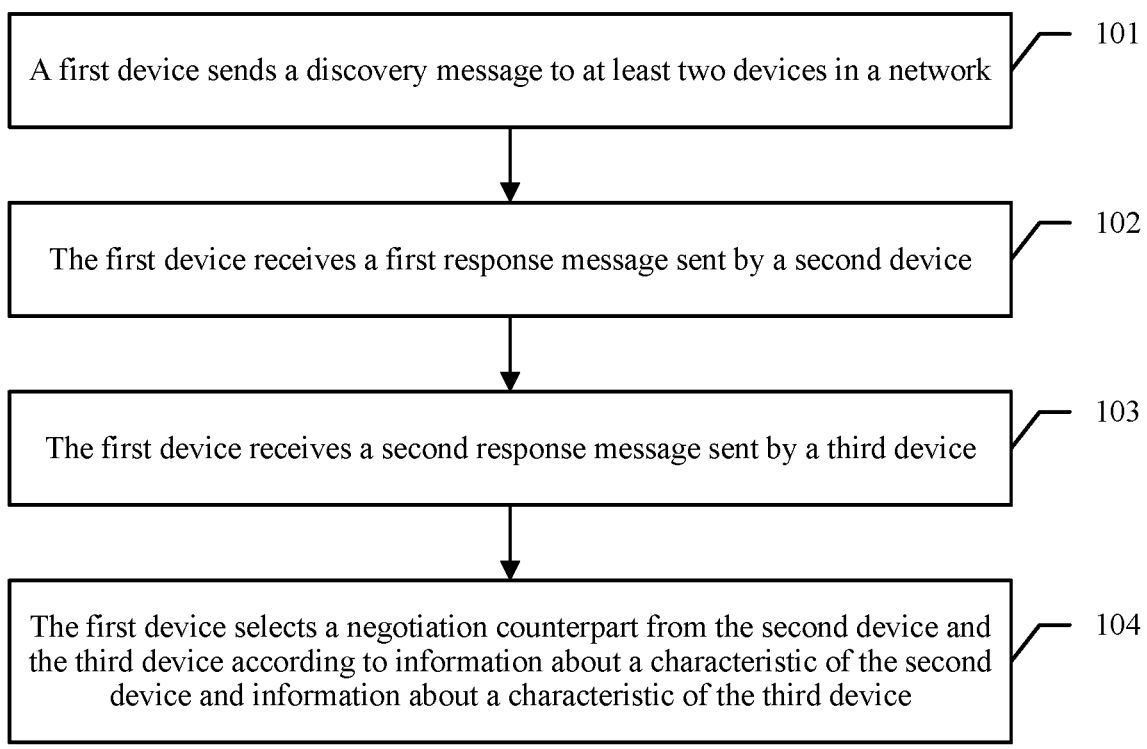
FIG. 1(a) is a simplified flowchart of a method for selecting a negotiation counterpart according to an embodiment of the present invention.
Figure 1B:
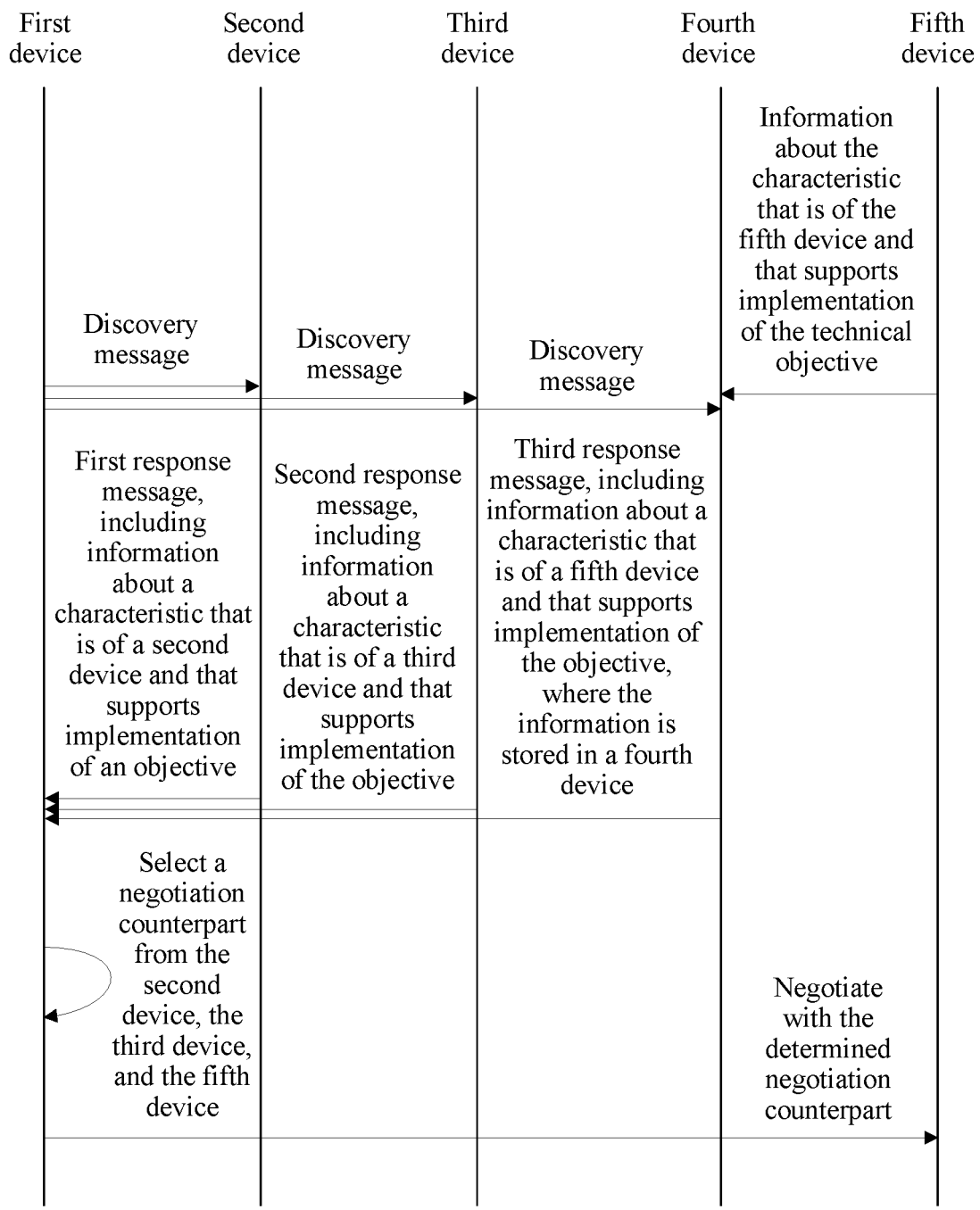
FIG. 1(*b*) is a simplified flowchart of a method for selecting a negotiation counterpart according to another embodiment of the present invention.

After sending the discovery message in the network, the first device may receive response messages sent by multiple devices. A technology at a current stage does not provide a relatively ideal method for how to select a suitable device from the multiple devices as the negotiation counterpart. An embodiment of the present invention provides a method for selecting a negotiation counterpart, and the method is used to select a preferred negotiation counterpart from multiple devices when a first device receives response messages sent by the multiple devices. Referring to FIG. 1(*a*), a basic process of the method includes the following steps.

101. A first device sends a discovery message to at least two devices in a network.

The first device sends the discovery message to the at least two devices in the network, to initiate a discovery process. The discovery message includes a technical objective. The technical objective is used to indicate a purpose of initiating the discovery process by the first device. The discovery message is used to find a device supporting the technical objective in the network.

The discovery message may include one technical objective. Alternatively, the discovery message may include at least two technical objectives. No limitation is imposed in this embodiment.

102. The first device receives a first response message sent by a second device.

The first device receives the first response message sent by the second device. The first response message is used to respond to the discovery message sent by the first device. The first response message is sent by the second device when the second device determines that the second device supports the technical objective in the discovery message. The first response message includes information about a characteristic that is of the second device and that supports implementation of the technical objective in the discovery message. The first response message should have a same session identifier (session ID) as the discovery message, to indicate that the first response message is used to respond to the discovery message.

It may be understood that a characteristic supporting implementation of a technical objective indicates a characteristic that a device in the network needs to have for implementing the technical objective, and information about the characteristic may reflect a technical objective support degree of the device in the network. For example, if the technical objective is "reserving a bandwidth", the characteristic supporting implementation of the technical objective may be "an available bandwidth that can be provided by a device", and the information about the characteristic that is of the second device and that supports implementation of the technical objective may be a value of an available bandwidth that can be provided by the second device. For another example, if the technical objective is "establishing a VPN tunnel", the characteristic supporting implementation of the technical objective may be "a forwarding capacity of a device", "a tunnel bandwidth", or a combination of "a forwarding capacity of a device" and "a tunnel bandwidth", and the information about the characteristic that is of the second device and that supports implementation of the technical objective may be a forwarding capacity of the second device, a tunnel bandwidth of the second device, or a combination of a forwarding capacity and a tunnel bandwidth of the second device. If the technical objective is "finding an address resource", the characteristic supporting implementation of the technical objective may be "a size of a longest consecutive address segment that can provided by a device", and the information about the characteristic that is of the second device and that supports implementation of the technical objective may be a size of a longest consecutive address segment that can be provided by the second device.

It may be understood that there may be one characteristic supporting implementation of one technical objective. Alternatively, there may be at least two characteristics supporting implementation of one technical objective. No limitation is imposed in this embodiment of the present invention.

103. The first device receives a second response message sent by a third device.

The first device receives the second response message sent by the third device. The second response message is used to respond to the discovery message sent by the first device. The second response message is sent by the third device when the third device determines that the third device supports the technical objective in the discovery message. The second response message includes information about a characteristic that is of the third device and that supports implementation of the technical objective in the discovery message. The second response message should have a same session identifier (session ID) as the discovery message, to indicate that the second response message is used to respond to the discovery message.

104. The first device selects a device matching a technical objective from the second device and the third device as a negotiation counterpart according to information about a characteristic that is of the second device and that supports implementation of the technical objective and information about a characteristic that is of the third device and that supports implementation of the technical objective.

The first device selects a device matching the technical objective from the second device and the third device as the negotiation counterpart according to the information about the characteristic that is of the second device and that supports implementation of the technical objective and the information about the characteristic that is of the third device and that supports implementation of the technical objective, where the former information is carried in the received first response message, and the latter information is carried in the received second response message.

It is mentioned in the foregoing description that information about a characteristic that is of a device and that supports implementation of a technical objective may reflect a technical objective support degree of the device. Therefore, after receiving the first response message and the second response message, the first device can know technical objective support degrees of the second device and the third device, and can further select a device with a higher technical objective support degree as the negotiation counterpart. For example, if the technical objective is "reserving a bandwidth", it is apparent that a device with a larger value of an available bandwidth has a higher technical objective support degree. The first device selects, from the second device and the third device as the negotiation counterpart, a device that provides an available bandwidth having a larger value. If the technical objective is "establishing a VPN tunnel", it is apparent that a device with a larger forwarding capacity or a device with a higher tunnel bandwidth has a higher technical objective support degree. The first device selects a device with a larger forwarding capacity or a higher tunnel bandwidth from the second device and the third device as the negotiation counterpart.

For example, when there are multiple characteristics supporting implementation of one technical objective, a response message received by a first network device may include information about the multiple characteristics. In this case, the information about the multiple characteristics needs to be comprehensively considered in a negotiation counterpart selection policy of the first device. Optionally, the first device may set priorities for the multiple characteristics, and the first device selects the negotiation counterpart from the second device and the third device first according to information that is about a higher-priority characteristic and is in the response message. When information about a higher-priority characteristic of the second device is the same as information about a higher-priority characteristic of the third device, and the negotiation counterpart cannot be selected only according to the information about the higher-priority characteristic, the first device selects the negotiation counterpart from the second device and the third device according to information that is about a lower-priority characteristic and is in the response message. Alternatively, the first device may set weights for the multiple characteristics, and then measure the technical objective support degrees of the second device and the third device by using a weighting method. For example, if the first device expects to establish a VPN tunnel with the negotiation counterpart, the technical objective is "establishing a VPN tunnel". Two characteristics supporting implementation of the technical objective exist: "a forwarding capacity of a device" and "a tunnel bandwidth". A weight of "a forwarding capacity of a device" is 0.2, and a weight of "a tunnel bandwidth" is 0.8. The first device receives the first response message with which the second device replies. A forwarding capacity of the second device included in the first response message is 20 G, and a tunnel bandwidth included in the first response message is 100 M. The first device further receives the second response message with which the third device replies. A forwarding capacity of the third device included in the second response message is 30 G, and a tunnel bandwidth included in the second response message is 50 M. The first device determines that the forwarding capacity 20 G is corresponding to 80 points, the forwarding capacity 30 G is corresponding to 90 points, the tunnel bandwidth 100 M is corresponding to 80 points, and the tunnel bandwidth 50 M is corresponding to 70 points. In this case, a score of the second device is 80×0.2+80×0.8=80, and a score of the third device is 90×0.2+70×0.8=74. Because the score of the second device is higher, the first device determines the second device as the negotiation counterpart.

In steps 102 and 103, the response messages sent by the second device and the third device include the information about their respective characteristics supporting implementation of the technical objective. It may be understood that the second device and the third device first need to determine the characteristic supporting implementation of the technical objective; then can determine the information about their respective characteristics supporting implementation of the technical objective; add, into the response messages, the information about their respective characteristics supporting implementation of the technical objective; and send the response messages to the first device. Therefore, optionally, in another embodiment of the present invention, before sending the discovery message, the first device may determine the characteristic supporting implementation of the technical objective, add the characteristic into the discovery message, and send the discovery message to another device in the network, so that a device receiving the discovery message can obtain the characteristic supporting implementation of the technical objective from the discovery message. There are multiple methods in which the first device determines the characteristic supporting implementation of the technical objective. For example, the first device may determine, by using one of the following two methods, the characteristic supporting implementation of the technical objective.

Method 1. A correspondence between the technical objective and the characteristic supporting implementation of the technical objective may be preset in the first device. In this case, the first device may determine, according to the correspondence, the characteristic supporting implementation of the technical objective. The correspondence preset in the first device may be set by a user, or may be a default setting of the first device. No limitation is imposed herein.

Method 2. The first device receives a notification message, and the notification message includes the characteristic supporting implementation of the technical objective. In this case, the first device may obtain the characteristic supporting implementation of the technical objective from the notification message. The notification message may be a flooded message or another message that is sent by any device in the network. After receiving the notification message, the first device may locally store a correspondence between the technical objective and the characteristic supporting implementation of the technical objective.

Optionally, a device in the network may send information about a characteristic of the device to another device by using a flooded message or another message, so that devices in the network store information about characteristics of each other. Particularly, if a fourth device in the network receives the discovery message sent by the first device, and information about a characteristic that is of a fifth device and that supports implementation of the technical objective is stored in the fourth device, the fourth device may send, to the first device, the information about the characteristic that is of the fifth device and that supports implementation of the technical objective. In this way, even if the fifth device does not receive the discovery message due to a network delay or the like, the first device may include the fifth device in a negotiation counterpart selection range. Therefore, in another embodiment of the present invention, referring to FIG. 1(b), the first device may further receive a third response message sent by the fourth device. The third response message is used to respond to the discovery message sent by the first device. The third response message is sent by the fourth device when the fourth device determines that the fifth device supports the technical objective in the discovery message. The third response message includes the information about the characteristic that is of the fifth device and that supports implementation of the technical objective in the discovery message, where the information is stored in the fourth device. Step 104 may be as follows: The first device selects a device matching the technical objective from the second device, the third device, and the fifth device as the negotiation counterpart according to the information about the characteristic that is of the second device and that supports implementation of the technical objective, the information about the characteristic that is of the third device and that supports implementation of the technical objective, and the information about the characteristic that is of the fifth device and that supports implementation of the technical objective. The fourth device may support the technical objective in the discovery message, or may not support the technical objective in the discovery message. No limitation is imposed herein.

Figure 1C:
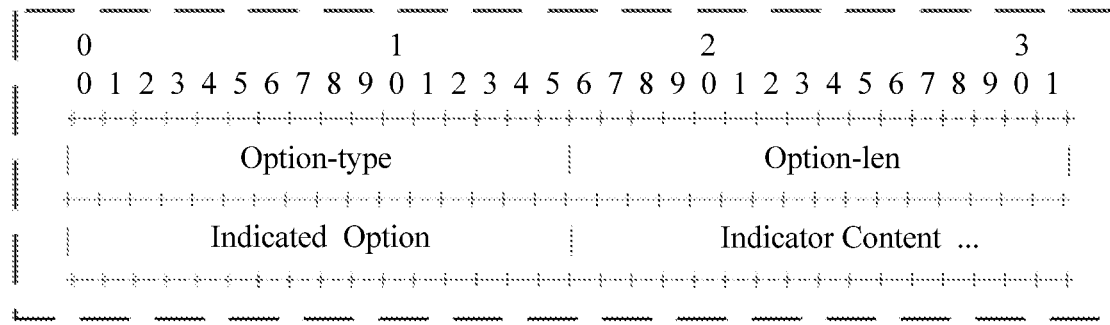

It is mentioned in the foregoing description that in this embodiment of the present invention, devices in the network may exchange a technical objective, a characteristic supporting implementation of the technical objective, information about a characteristic supporting implementation of the technical objective, and the like by using a discovery message, a response message, or another message. Optionally, the information may be directly carried in a message packet sent by the device, or may be encapsulated as a structure with a specific format, and then carried in a message packet. A network using a GRASP protocol is used as an example: A message packet in the network using the GRASP protocol includes multiple encapsulated structures. Each structure is referred to as an option (Option). Each option includes four fields that respectively indicate a type of the option, a length of the option, information carried in the option, and specific content of the information carried in the option. FIG. 1(c) is a schematic diagram of an option. In FIG. 1(c), an Option-type field is used to indicate a type of the option. In this embodiment of the present invention, the type of the option includes a technical objective type, a characteristic type, and a characteristic information type. If the option is used to carry only a technical objective, the option is of the technical objective type. If the option carries a technical objective and a characteristic supporting implementation of the technical objective, the option is of the characteristic type. If the option carries information about a characteristic that is of a device and that supports implementation of a technical objective, the option is of the characteristic information type. Each type may be uniquely identified by a corresponding digit or another character. An Option-len field is used to indicate a length of the option. An Indicated Option field is used to indicate information carried in the option. In this embodiment of the present invention, a technical objective corresponding to the option is filled in this field, for example, an address prefix and reserving a bandwidth. An Indicator Content field is used to indicate specific content of the information carried in the option.

In this embodiment of the present invention, both a discovery message and a response message may include the structure described in the last paragraph. Because the discovery message needs to carry a technical objective, the discovery message should include an option of the technical objective type. The technical objective that the discovery message needs to carry is filled in an Indicated Option field of the option. An Indicator Content field of the option is invalid, and may be left empty. In some embodiments of the present invention, the discovery message may also carry a characteristic supporting implementation of the technical objective. In this case, the discovery message may include an option of the characteristic type. The technical objective that the discovery message needs to carry is filled in an Indicated Option field of the option. The characteristic supporting implementation of the technical objective corresponding to the option is filled in an Indicator Content field of the option.

In this embodiment of the present invention, if a device sending a response message supports the technical objective in the discovery message, the response message needs to carry information about a characteristic that is of the device sending the response message and that supports implementation of the technical objective. Therefore, the response message should include an option of the characteristic information type. The technical objective is filled in an Indicated Option field of the option. The device sending the message is filled in an Indicator Content field of the option.

In addition, the Option-type field may be a divert type that is used when the device sending the response message stores information about a characteristic that is of another device (which is alternatively referred to as a target device below) and that supports implementation of the technical objective. An option of the divert type also includes an Option-type field, an Option-len field, an Indicated Option field, and an Indicator Counter field. The technical objective is filled in the Indicated Option field. The information about the characteristic that is of the target device and that supports implementation of the technical objective is filled in the Indicator Content field, where the information is stored in the device sending the response message. In addition, a locator option is nested in the option of the divert type. The locator option carries identification information of the target device.

In a packet in this embodiment of the present invention, a length of each field may be 16 bits. However, a length of the Indicator Content field or a length of another field may also be another quantity of bits. No limitation is imposed in this embodiment of the present invention. Each encapsulated structure may also have another name. No limitation is imposed in this embodiment of the present invention. The information encapsulation manner described in this paragraph may also be used in a network using a protocol other than the GRASP. No limitation is imposed in this embodiment of the present invention.

Generally, the first device may be a physical entity, or may be a virtual device that runs on a physical entity and is presented in a form of a virtual machine or other virtual software. Similarly, the negotiation counterpart determined by the first device may be a physical entity device, or may be a virtual machine or other virtual software that runs on a physical entity.

Figure 2:
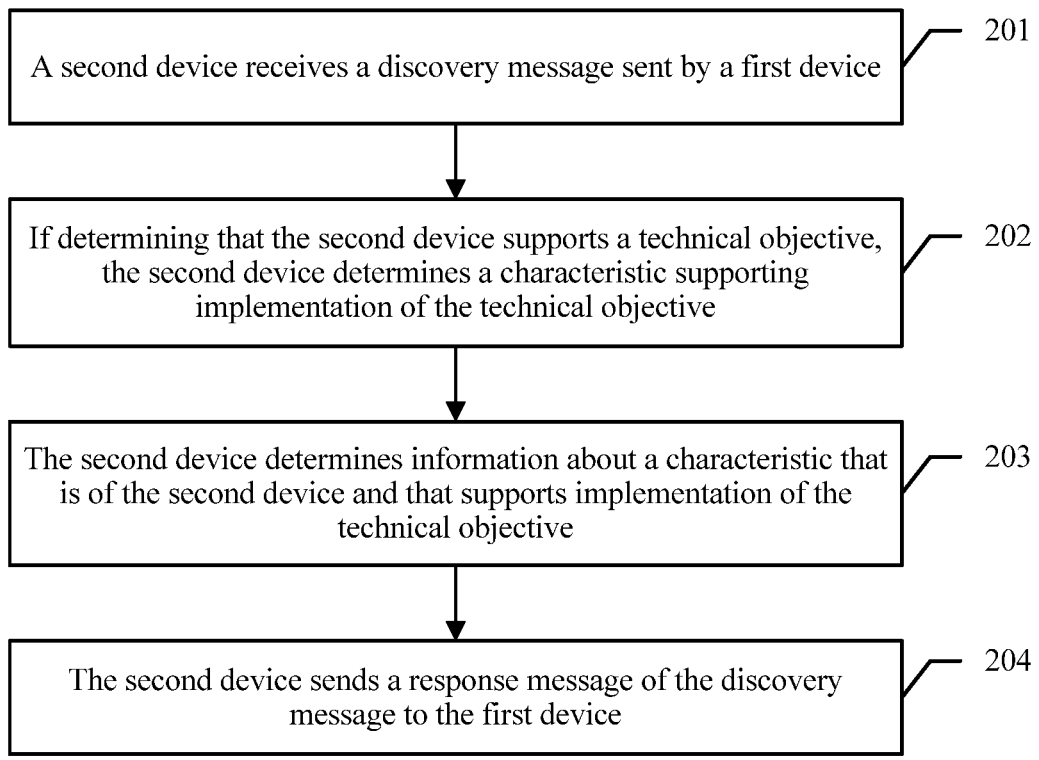
FIG. 2 is a simplified flowchart of a response method according to an embodiment of the present invention.

In all the foregoing embodiments, the method for selecting a negotiation counterpart provided in this embodiment of the present invention is described from a perspective of the first device. It can be learned that the first device plays a role of an initiating device in all the foregoing embodiments. The following describes a corresponding response method from a perspective of a response device. Referring to FIG. 2, a basic process of the method includes the following steps.

201. A second device receives a discovery message sent by a first device. For description of the discovery message, refer to 101, and details are not described herein again.

202. If determining that the second device supports a technical objective, the second device determines a characteristic supporting implementation of the technical objective.

If the second device determines that the second device supports the technical objective, the second device determines the characteristic supporting implementation of the technical objective. The characteristic supporting implementation of the technical objective is used to indicate a characteristic that a device supporting the technical objective needs to have.

203. The second device determines information about a characteristic that is of the second device and that supports implementation of the technical objective.

After determining the characteristic supporting implementation of the technical objective, the second device determines the information about the characteristic that is of the second device and that supports implementation of the technical objective. It may be understood that the information about the characteristic that is of the second device and that supports implementation of the technical objective reflects a technical objective support degree of the second device.

204. The second device sends, to the first device, a response message that is used to respond to the discovery message.

After determining the information about the characteristic that is of the second device and that supports implementation of the technical objective, the second device sends, to the first device, the response message that is used to respond to the discovery message. The response message includes the information about the characteristic that is of the second device and that supports implementation of the technical objective.

This embodiment provides the response method. The second device receives the discovery message sent by the first device, and the discovery message includes the technical objective. When determining that the second device supports the technical objective, the second device determines the characteristic supporting implementation of the technical objective. The second device determines the information about the characteristic that is of the second device and that supports implementation of the technical objective. The second device sends the response message of the discovery message to the first device, and the response message includes the information about the characteristic that is of the second device and that supports implementation of the technical objective. In the method provided in this embodiment of the present invention, the second device can notify, by using the response message, the first device of the information about the characteristic that is of the second device and that supports implementation of the technical objective, so that the first device learns the technical objective support degree of the second device, and can further select a device with a higher technical objective support degree from the second device and another device as a negotiation counterpart. Compared with a case in which a negotiation counterpart is selected randomly or by using a fixed policy in the prior art, the method provided in this embodiment provides more reference information for the first device, so that the first device can select a relatively suitable negotiation counterpart, and an effect of negotiation between devices is ensured.

In step 202, when determining that the second device supports the technical objective, the second device needs to determine the characteristic supporting implementation of the technical objective. There are multiple methods in which the second device determines the characteristic supporting implementation of the technical objective. For example, the second device may determine, by using one of the following three methods, the characteristic supporting implementation of the technical objective.

Method A: A correspondence between the technical objective and the characteristic supporting implementation of the technical objective may be preset in the second device. In this case, the second device may determine, according to the correspondence, the characteristic supporting implementation of the technical objective. The correspondence preset in the second device may be set by a user, or may be a default setting of the second device. No limitation is imposed herein.

Method B: The second device receives a notification message. The notification message includes the characteristic supporting implementation of the technical objective. In this case, the second device may obtain the characteristic supporting implementation of the technical objective from the notification message. The notification message may be a flooded message or another message that is sent by any device in a network. After receiving the notification message, the second device may locally store, according to the notification message, a correspondence between the technical objective and the characteristic supporting implementation of the technical objective.

Method C: The discovery message sent by the first device includes the characteristic supporting implementation of the technical objective. After receiving the discovery message, the second device can obtain the characteristic supporting implementation of the technical objective from the discovery message. Optionally, the characteristic that supports implementation of the technical objective and that is in the discovery message may be corresponding to the technical objective, and the correspondence is stored locally.

Optionally, a device in the network may send information about a characteristic of the device to another device by using a flooded message or another message, so that devices in the network store information about characteristics of each other. In this way, information about a characteristic that is of a third device and that supports implementation of the technical objective may be stored in the second device. Therefore, if the second device receives the discovery message sent by the first device, and the information about the characteristic that is of the third device and that supports implementation of the technical objective is stored in the second device, the second device may add, into the response message, the information about the characteristic that is of the third device and that supports implementation of the technical objective, and send the response message to the first device. In this way, even if the third device does not receive the discovery message due to a network delay or the like, the first device may include the third device in a negotiation counterpart selection range. For example, if the second device does not support the technical objective in the discovery message, and the information about the characteristic that is of the third device and that supports implementation of the technical objective is stored in the second device, the second device sends, to the first device, a response message that is used to respond to the discovery message, where the response message includes the information about the characteristic that is of the third device and that supports implementation of the technical objective, and the information is stored in the second device. For another example, if the second device supports the technical objective in the discovery message, and the information about the characteristic that is of the third device and that supports implementation of the technical objective is stored in the second device, the response message that is sent by the second device to the first device and is used to respond to the discovery message includes the information about the characteristic that is of the second device and that supports implementation of the technical objective and the information about the characteristic that is of the third device and that supports implementation of the technical objective, where the latter information is stored in the second device.

To facilitate understanding of the foregoing embodiment, the following is described by using one specific application scenario of the foregoing embodiment as an example.

There are five devices in a network using a GRASP protocol, which are respectively devices A, B, C, D, and E. At a moment, the device A initiates a discovery process, and sends a discovery message to other devices in the network. The discovery message includes a technical objective of "establishing a VPN tunnel".

The devices B, C, and E support VPN tunnel establishment, but only the devices B, C, and D receive the discovery message. The devices B, C, and D determine, according to a locally preset correspondence between a technical objective and a characteristics supporting implementation of the technical objective, that a characteristic supporting implementation of "establishing a VPN tunnel" includes "a forwarding capacity of a device" and "a tunnel bandwidth".

A forwarding capacity of the device B is 20 G, and a tunnel bandwidth is 100 M. A forwarding capacity of the device C is 30 and a tunnel bandwidth is 50 M. Information about a forwarding capacity and a tunnel bandwidth of the device E is stored in the device D. The forwarding capacity of the device E is 25 and the tunnel bandwidth is 90 M. The device B feeds back a response message to the device A, and the response message includes information about the forwarding capacity and the tunnel bandwidth of device B. The device C feeds back a response message to the device A, and the response message includes information about the forwarding capacity and the tunnel bandwidth of the device C. The device D feeds back a response message to the device A, and the response message includes the information about the forwarding capacity and the tunnel bandwidth of the device E.

After receiving the response messages from the devices B, C, and D, the device A selects a negotiation counterpart from the devices B, C, and E. A selection rule is set in the device A: A weight of "a forwarding capacity of a device" is 0.2, and a weight of "a tunnel bandwidth" is 0.8. The forwarding capacity 20 G of a device is corresponding to 80 points, the forwarding capacity 30 G is corresponding to 90 points, and the forwarding capacity 25 G is corresponding to 85 points. The tunnel bandwidth 100 M is corresponding to 80 points, the tunnel bandwidth 50 M is corresponding to 70 points, and the tunnel bandwidth 90 M is corresponding to 78 points. In this case, the device A determines that a score of the device B is 80×0.2+80×0.8=80, a score of the device C is 90×0.2+70×0.8=74, and a score of the device E is 85×0.2+78×0.8=79.4. Because the score of the device B is relatively high, the device A determines the device B as the negotiation counterpart, and establishes a VPN tunnel with the device B.

Figure 3:
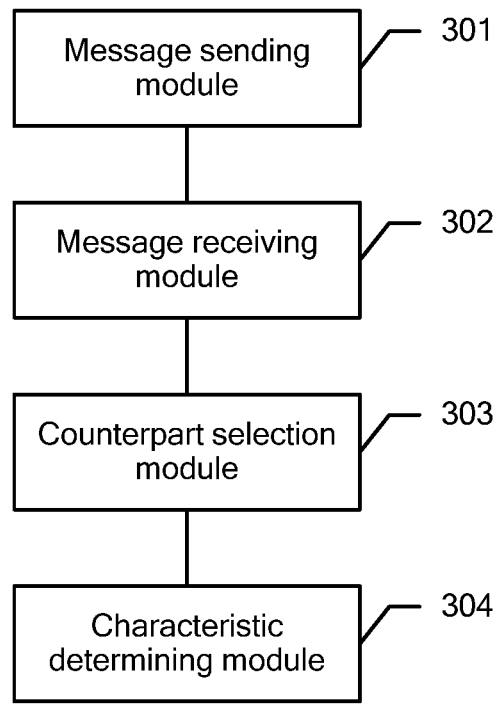
FIG. 3 is a schematic structural diagram of an apparatus for selecting a negotiation counterpart according to an embodiment of the present invention.

The foregoing embodiments provide basic processes of the method for selecting a negotiation counterpart and the response method that are provided in embodiments of the present invention. The following describes apparatuses for implementing the methods. Referring to FIG. 3, an apparatus for selecting a negotiation counterpart provided in an embodiment of the present invention acts as a first device in a network, and a basic structure of the apparatus includes:

a message sending module 301, configured to send a discovery message to at least two devices in the network, where the discovery message includes a technical objective, and the discovery message is used to find a device supporting the technical objective;

a message receiving module 302, configured to receive a first response message that is sent by a second device and is used to respond to the discovery message, where the first response message includes information about a characteristic that is of the second device and that supports implementation of the technical objective, and the message receiving module 302 is further configured to receive a second response message that is sent by a third device and is used to respond to the discovery message, where the second response message includes information about a characteristic that is of the third device and that supports implementation of the technical objective; and a counterpart selection module 303, configured to select a device matching the technical objective from the second device and the third device as a negotiation counterpart according to the information about the characteristic that is of the second device and that supports implementation of the technical objective and the information about the characteristic that is of the third device and that supports implementation of the technical objective.

This embodiment provides the apparatus for selecting a negotiation counterpart. The message sending module 301 sends the discovery message to the at least two devices in the network, and the discovery message includes the technical objective. The message receiving module 302 receives the first response message sent by the second device, and the first response message includes the information about the characteristic that is of the second device and that supports implementation of the technical objective. The message receiving module 302 further receives the second response message sent by the third device, and the response message includes the information about the characteristic that is of the third device and that supports implementation of the technical objective. The counterpart selection module 303 selects a device matching the technical objective from the second device and the third device as the negotiation counterpart according to the information about the characteristic that is of the second device and that supports implementation of the technical objective and the information about the characteristic that is of the third device and that supports implementation of the technical objective. Different characteristics support implementation of different technical objectives, and information about a characteristic supporting implementation of a technical objective reflects a technical objective support degree of a device. Therefore, the counterpart selection module 303 in this embodiment can select a device with a higher technical objective support degree from the second device and the third device as the negotiation counterpart according to the first response information and the second response information. Compared with a case in which a negotiation counterpart is selected randomly or by using a fixed policy in the prior art, the apparatus provided in this embodiment can select a relatively suitable negotiation counterpart, so that an effect of negotiation between devices is ensured.

Optionally, the apparatus for selecting a negotiation counterpart provided in this embodiment of the present invention further includes a characteristic determining module 304, configured to determine a characteristic supporting implementation of the technical objective. The discovery message sent by the message sending module 301 further includes the characteristic that supports implementation of the technical objective and is determined by the characteristic determining module 304. The characteristic determining module 304 is an optional module. The apparatus for selecting a negotiation counterpart provided in this embodiment of the present invention may not include the characteristic determining module 304.

Optionally, in some embodiments of the present invention, the apparatus for selecting a negotiation counterpart further includes a memory. A correspondence between the technical objective and the characteristic supporting implementation of the technical objective may be preset in the memory. The characteristic determining module 304 may determine, according to the correspondence that is between the technical objective and the characteristic supporting implementation of the technical objective and that is preset in the first device, the characteristic supporting implementation of the technical objective.

Optionally, in some embodiments of the present invention, the message receiving module 301 is further configured to receive a notification message, and the notification message carries the characteristic supporting implementation of the technical objective. The characteristic determining module 304 is further configured to obtain, from the notification message received by the message receiving module 301, the characteristic supporting implementation of the technical objective carried in the received discovery message.

Optionally, in some embodiments of the present invention, the message receiving module 301 is further configured to receive a third response message that is sent by a fourth device and is used to respond to the discovery message. Information about a characteristic that is of a fifth device and that supports implementation of the technical objective is stored in the fourth device. The third response message includes the information about the characteristic that is of the fifth device and that supports implementation of the technical objective. The counterpart selection module 303 is further configured to select a device matching the technical objective from the second device, the third device, and the fifth device as the negotiation counterpart according to the information about the characteristic that is of the second device and that supports implementation of the technical objective, the information about the characteristic that is of the third device and that supports implementation of the technical objective, and the information about the characteristic that is of the fifth device and that supports implementation of the technical objective.

Figure 4:
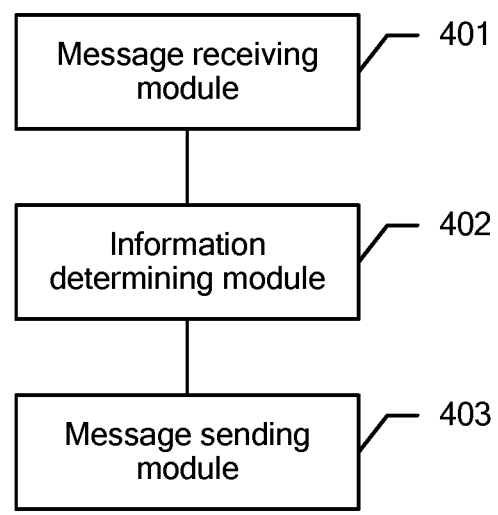
FIG. 4 is a schematic structural diagram of an apparatus for responding to a discovery message according to an embodiment of the present invention.

An apparatus for responding to a discovery message provided in an embodiment of the present invention acts as a second device in a network. Referring to FIG. 4, a basic structure of the apparatus includes:

a message receiving module 401, configured to receive a discovery message sent by a first device, where the discovery message includes a technical objective, and the discovery message is used to find a device supporting the technical objective;

an information determining module 402, configured to: when the second device supports the technical objective, determine a characteristic supporting implementation of the technical objective, and determine information about a characteristic that is of the second device and that supports implementation of the technical objective; and a message sending module 403, configured to send, to the first device, a response message that is used to respond to the discovery message, where the response message includes the information about the characteristic that is of the second device and that supports implementation of the technical objective.

This embodiment provides the apparatus for responding to a discovery message. The message receiving module 401 receives the discovery message sent by the first device, and the discovery message includes the technical objective. When determining that the second device supports the technical objective, the information determining module 402 determines the characteristic supporting implementation of the technical objective, and determines the information about the characteristic that is of the second device and that supports implementation of the technical objective. The message sending module 403 sends the response message of the discovery message to the first device, and the response message includes the information about the characteristic that is of the second device and that supports implementation of the technical objective. The apparatus for responding to a discovery message provided in this embodiment of the present invention notifies, by using the response message, the first device of the information about the characteristic that is of the apparatus and that supports implementation of the technical objective. The information about the characteristic supporting implementation of the technical objective reflects a technical objective support degree of the second device. Therefore, in this embodiment, when receiving response messages sent by multiple second devices, the first device can select a device matching the technical objective as the negotiation counterpart according to information about characteristics that are of the second devices and that support implementation of the technical objective. Compared with a case in which a negotiation counterpart is selected randomly or by using a fixed policy in the prior art, the apparatus provided in this embodiment can select a relatively suitable negotiation counterpart, so that an effect of negotiation between devices is ensured.

Optionally, in some embodiments of the present invention, the apparatus for responding to a discovery message may further include a memory. A correspondence between the technical objective and the characteristic supporting implementation of the technical objective may be further preset in the memory. The information determining module 402 is further configured to determine, according to the correspondence between the technical objective and the characteristic supporting implementation of the technical objective, the characteristic supporting implementation of the technical objective.

Optionally, in some embodiments of the present invention, the message receiving module 401 is further configured to receive a notification message, and the notification message carries the characteristic supporting implementation of the technical objective. The information determining module 402 is further configured to obtain the characteristic supporting implementation of the technical objective from the notification message.

Optionally, in some embodiments of the present invention, the discovery message further includes the characteristic supporting implementation of the technical objective. The information determining module 402 is further configured to obtain the characteristic supporting implementation of the technical objective from the discovery message.

Optionally, in some embodiments of the present invention, the apparatus for responding to a discovery message further includes a relationship storage module, configured to store a correspondence between the technical objective and the characteristic supporting implementation of the technical objective. The relationship storage module is an optional module. The apparatus for responding to a discovery message provided in this embodiment of the present invention may not include the relationship storage module.

Optionally, in some embodiments of the present invention, the message sending module 403 is further configured to: if information about a characteristic that is of a third device and that supports implementation of the technical objective is stored in the second device, send, to the first device, a response message that is used to respond to the discovery message, where the response message includes the information about the characteristic that is of the third device and that supports implementation of the technical objective, and the information is stored in the second device.

Figure 5:
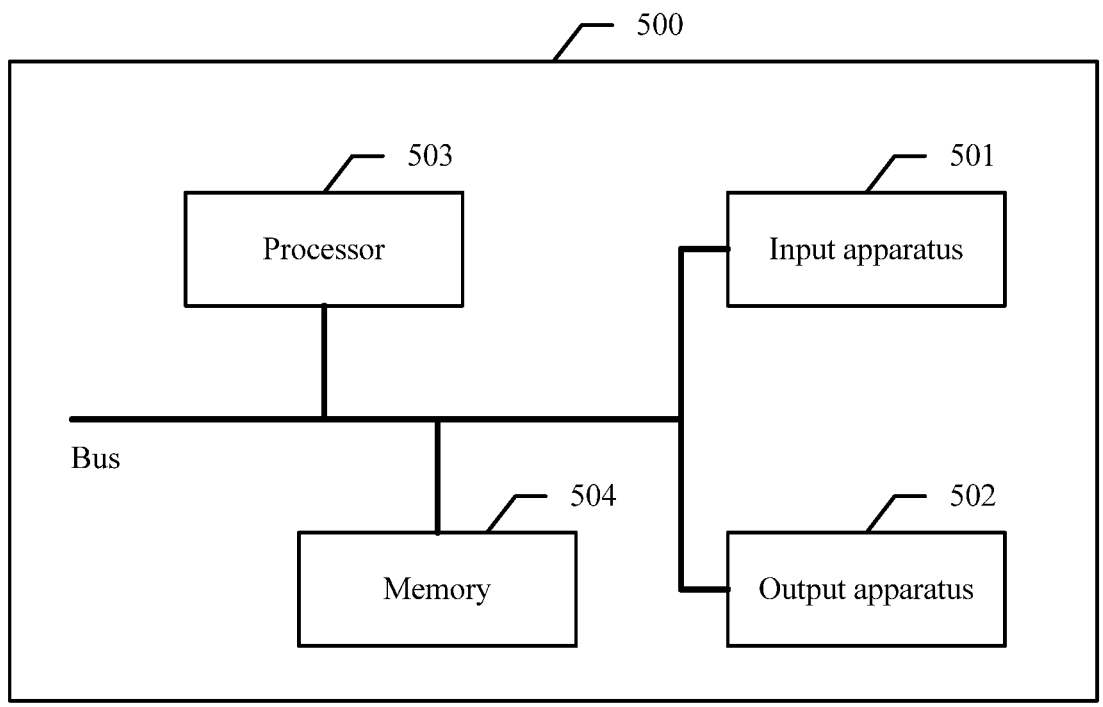
FIG. 5 is a schematic structural diagram of an apparatus for selecting a negotiation counterpart according to an embodiment of the present invention.

The foregoing describes the apparatus for selecting a negotiation counterpart in embodiments of the present invention from a perspective of a function apparatus. The following provides a device for selecting a negotiation counterpart from a perspective of a hardware device, and the device acts as a first device in a network. Referring to FIG. 5, a structure of an apparatus 500 for selecting a negotiation counterpart in an embodiment of the present invention includes:

an input apparatus 501, an output apparatus 502, a processor 503, and a memory 504 (there may be one or more processors 503 in the apparatus 500 for selecting a negotiation counterpart, and one processor 503 is used as an example in FIG. 5). In some embodiments of the present invention, the input apparatus 501, the output apparatus 502, the processor 503, and the memory 504 may be connected by using a bus or in another manner. Connection by using a bus is used as an example in FIG. 5.

The memory stores a computer-executable operation instruction. When the operation instruction is being executed, the processor performs the following steps:

sending a discovery message to at least two devices in the network, where the discovery message includes a technical objective, and the discovery message is used to find a device supporting the technical objective;

receiving a first response message that is sent by a second device and is used to respond to the discovery message, where the first response message includes information about a characteristic that is of the second device and that supports implementation of the technical objective;

receiving a second response message that is sent by a third device and is used to respond to the discovery message, where the second response message includes information about a characteristic that is of the third device and that supports implementation of the technical objective; and selecting a device matching the technical objective from the second device and the third device as a negotiation counterpart according to the information about the characteristic that is of the second device and that supports implementation of the technical objective and the information about the characteristic that is of the third device and that supports implementation of the technical objective.

Optionally, in some embodiments of the present invention, the memory 504 further includes a computer-executable instruction, used to: before the discovery message is sent to the at least two devices in the network, determine a characteristic supporting implementation of the technical objective. Correspondingly, the discovery message further includes the characteristic supporting implementation of the technical objective.

Optionally, in some embodiments of the present invention, a correspondence between the technical objective and the characteristic supporting implementation of the technical objective is preset in the memory 504, and the memory 504 further includes a computer-executable instruction, used to:

determine, according to the preset correspondence between the technical objective and the characteristic supporting implementation of the technical objective, the characteristic supporting implementation of the technical objective.

Optionally, in some embodiments of the present invention, the memory 504 further includes a computer-executable instruction, used to:

receive a notification message before the characteristic supporting implementation of the technical objective is determined, where the notification message carries the characteristic supporting implementation of the technical objective; and obtain the characteristic supporting implementation of the technical objective from the notification message.

Optionally, in some embodiments of the present invention, the memory 504 further includes a computer-executable instruction, used to:

after the discovery message is sent to the at least two devices in the network, receive a third response message that is sent by a fourth device and is used to respond to the discovery message, where the third response message includes information about a characteristic that is of a fifth device and that supports implementation of the technical objective, and the information is stored in the fourth device; and select a device matching the technical objective from the second device, the third device, and the fifth device as the negotiation counterpart according to the information about the characteristic that is of the second device and that supports implementation of the technical objective, the information about the characteristic that is of the third device and that supports implementation of the technical objective, and the information about the characteristic that is of the fifth device and that supports implementation of the technical objective.

Figure 6:
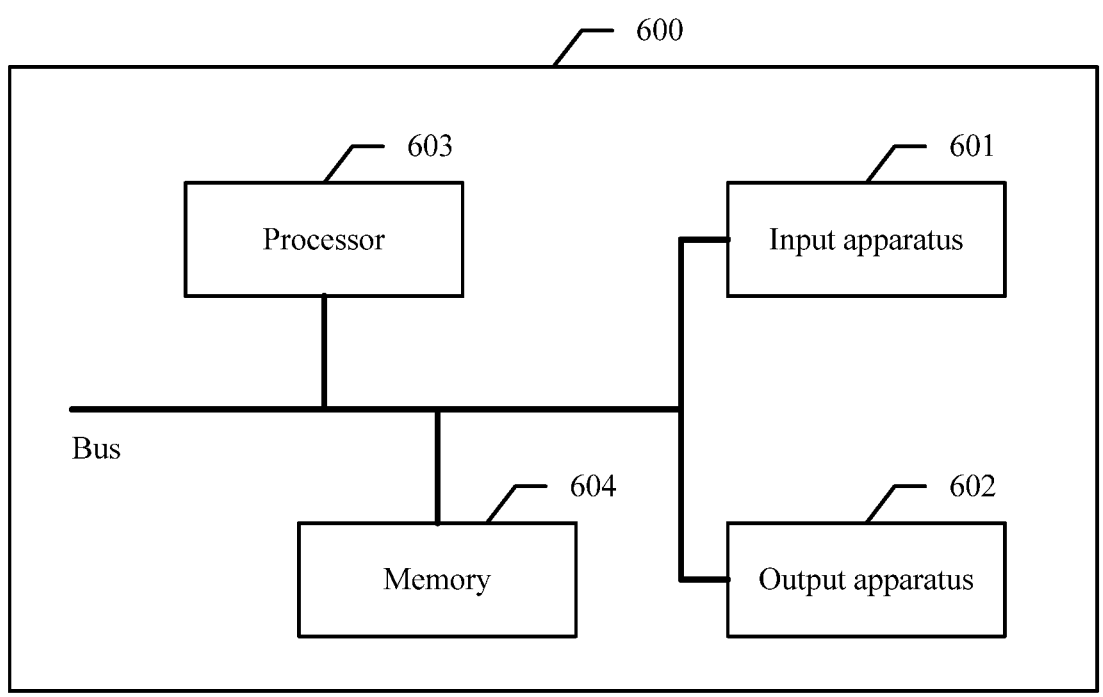
FIG. 6 is a schematic structural diagram of an apparatus for responding to a discovery message according to an embodiment of the present invention.

The following provides a device for selecting a negotiation counterpart from a perspective of a hardware device, and the device acts as a first device in a network. Referring to FIG. 6, a structure of an apparatus 600 for responding to a discovery message in an embodiment of the present invention includes:

an input apparatus 601, an output apparatus 602, a processor 603, and a memory 604 (there may be one or more processors 603 in the apparatus 600 for responding to a discovery message, and one processor 603 is used as an example in FIG. 6). In some embodiments of the present invention, the input apparatus 601, the output apparatus 602, the processor 603, and the memory 604 may be connected by using a bus or in another manner. Connection by using a bus is used as an example in FIG. 6.

The memory stores a computer-executable operation instruction. When the operation instruction is being executed, the processor performs the following steps:

receiving a discovery message sent by a first device, where the discovery message includes a technical objective, and the discovery message is used to find a device supporting the technical objective;

if the second device supports the technical objective, determining a characteristic supporting implementation of the technical objective;

determining information about a characteristic that is of the second device and that supports implementation of the technical objective; and sending, to the first device, a response message that is used to respond to the discovery message, where the response message includes the information about the characteristic that is of the second device and that supports implementation of the technical objective.

Optionally, in some embodiments of the present invention, a correspondence between the technical objective and the characteristic supporting implementation of the technical objective is preset in the memory 604, and the memory 604 further includes a computer-executable instruction, used to:

determine, according to the correspondence between the technical objective and the characteristic supporting implementation of the technical objective, the characteristic supporting implementation of the technical objective.

Optionally, in some embodiments of the present invention, the memory 604 further includes a computer-executable instruction, used to:

receive a notification message before the characteristic supporting implementation of the technical objective is determined, where the notification message carries the characteristic supporting implementation of the technical objective; and obtain the characteristic supporting implementation of the technical objective from the notification message.

Optionally, in some embodiments of the present invention, the discovery message further includes the characteristic supporting implementation of the technical objective, and the processor 603 is further configured to perform the following step:

obtaining the characteristic supporting implementation of the technical objective from the discovery message.

Optionally, in some embodiments of the present invention, the memory 604 further includes a computer-executable instruction, used to:

after the characteristic supporting implementation of the technical objective is determined, store a correspondence between the technical objective and the characteristic supporting implementation of the technical objective.

Optionally, in some embodiments of the present invention, the memory 604 further includes a computer-executable instruction, used to:

if information about a characteristic that is of a third device and that supports implementation of the technical objective is stored in the second device, send, to the first device, a response message that is used to respond to the discovery message, where the response message includes the information about the characteristic that is of the third device and that supports implementation of the technical objective, and the information is stored in the second device.

It may be clearly understood by a person skilled in the art that, for the purpose of convenient and brief description, for a detailed working procedure of the foregoing system, module, and unit, refer to a corresponding procedure in the foregoing method embodiments, and details are not described herein.

In the several embodiments provided in this application, it should be understood that the disclosed system and method may be implemented in other manners. For example, the described system embodiment is only an example. For example, the unit division is only logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the modules or units may be implemented in electronic, mechanical, or other forms.

The units described as separate parts may or may not be physically separate, and parts displayed as units may or may not be physical units, may be located in one position, or may be distributed on multiple physical units. Some or all of the units may be selected according to actual needs to achieve objectives of solutions of embodiments.

In addition, functional units in embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in embodiments of the present invention. The storage medium includes: any medium that can store program code, such as a Universal Serial Bus (USB) flash drive, a removable hard disk, a read-only memory (ROM), a random access memory (RAM), a magnetic disk, or an optical disc.

Objectives, technical solutions, and benefits of the present invention are described in the foregoing exemplary embodiments by using examples. It should be understood that the foregoing descriptions are only exemplary embodiments of the present invention, but are not intended to limit the protection scope of the present invention. Any modification, equivalent replacement, or improvement made based on the technical solutions of the present invention shall fall within the protection scope of the present invention.

Additionally, statements made herein characterizing the invention refer to an embodiment of the invention and not necessarily all embodiments.

What is claimed is:

1. A method for selecting a negotiation counterpart, comprising:
    sending, by a first device, a discovery message to at least two devices in a network, wherein the discovery message comprises a technical objective, and the discovery message is for finding a device supporting the technical objective, wherein the technical objective indicates a purpose of the first device sending the discovery message;
    receiving, by the first device, a first response message from a second device in response to the discovery message, wherein the first response message comprises information about one or more characteristics of the second device supporting implementation of the technical objective, wherein each of the one or more characteristics of the second device is associated with a priority, and wherein the information about the one or more characteristics of the second device reflects a degree to which the second device supports the technical objective;
    receiving, by the first device, a second response message from a third device in response to the discovery message, wherein the second response message comprises information about one or more characteristics of the third device supporting implementation of the technical objective, wherein each of the one or more characteristics of the third device is associated with a priority, and wherein the information about the one or more characteristics of the third device reflects a degree to which the third device supports the technical objective; and
    selecting, by the first device, the second device or the third device as a negotiation counterpart based on the one or more characteristics of the second device, one or more priorities associated with the one or more characteristics of the second device, the degree to which the second device supports the technical objective, the one or more characteristics of the third device, one or more priorities associated with the one or more characteristics of the third device, and the degree to which the third device supports the technical objective.

2. The method according to claim 1, wherein the discovery message comprises a first option, wherein a first field of the first option corresponds a technical objective type, a second field of the first option corresponds to a length of the first option, and a third field of the first option corresponds to the technical objective.

3. The method according to claim 1, wherein the discovery message comprises a first option, wherein a first field of the first option corresponds to a characteristic type, a second field of the first option corresponds to a length of the first option, a third field of the first option corresponds to the technical objective, and a fourth field of the first option corresponds to one or more characteristics supporting implementation of the technical objective.

4. The method according to claim 1, wherein the first response message comprises a second option, wherein a first field of the second option corresponds to a characteristic information type, a second field of the second option corresponds to a length of the second option, a third field of the second option corresponds to the technical objective, and a fourth field of the second option corresponds to the information about the one or more characteristics of the second device supporting implementation of the technical objective; and
    wherein the second response message comprises a third option, wherein a first field of the third option corresponds to a characteristic information type, a second field of the third option corresponds to a length of the third option, a third field of the third option corresponds to the technical objective, and a fourth field of the third option corresponds to the information about the one or more characteristics of the third device supporting implementation of the technical objective.

5. The method according to claim 1, wherein the first response message comprises a fourth option, wherein a first field of the fourth option corresponds to a divert type, a second field of the fourth option corresponds to a length of the fourth option, a third field of the fourth option corresponds to the technical objective, and a fourth field of the fourth option corresponds to the information about one or more characteristics of a fifth device supporting implementation of the technical objective; and
    wherein the fourth option further comprises a fifth field for carrying identification information of the fifth device.

6. A first device for selecting a negotiation counterpart, comprising a processor and a memory having processor-executable instructions stored thereon, wherein the processor-executable instructions, when executed by the processor, facilitate performance of the following:
    sending a discovery message to at least two devices in the network, wherein the discovery message comprises a technical objective, and the discovery message is for finding a device supporting the technical objective, wherein the technical objective indicates a purpose of the first device sending the discovery message;
    receiving a first response message from a second device in response to the discovery message, wherein the first response message comprises information about one or more characteristics of the second device supporting implementation of the technical objective, wherein each of the one or more characteristics of the second device is associated with a priority, and wherein the information about the one or more characteristics of the second device reflects a degree to which the second device supports the technical objective;

receiving a second response message from a third device in response to the discovery message, wherein the second response message comprises information about one or more characteristics of the third device supporting implementation of the technical objective, wherein each of the one or more characteristics of the third device is associated with a priority, and wherein the information about the one or more characteristics of the third device reflects a degree to which the third device supports the technical objective; and selecting the second device or the third device as a negotiation counterpart based on the one or more characteristics of the second device, one or more priorities associated with the one or more characteristics of the second device, the degree to which the second device supports the technical objective, the one or more characteristics of the third device, one or more priorities associated with the one or more characteristics of the third device, and the degree to which the third device supports the technical objective.

7. The device according to claim 6, wherein the discovery message comprises a first option, wherein a first field of the first option corresponds to a technical objective type, a second field of the first option corresponds to a length of the first option, and a third field of the first option corresponds to the technical objective.

8. The device according to claim 6, wherein the discovery message comprises a first option, wherein a first field of the first option corresponds to a characteristic type, a second field of the first option corresponds to a length of the first option, a third field of the first option corresponds to the technical objective, and a fourth field of the first option corresponds to one or more characteristics supporting implementation of the technical objective.

9. The device according to claim 6, wherein the first response message comprises a second option, wherein a first field of the second option corresponds to a characteristic information type, a second field of the second option corresponds to a length of the second option, a third field of the second option corresponds to the technical objective, and a fourth field of the second option corresponds to the information about the one or more characteristics of the second device supporting implementation of the technical objective; and wherein the second response message comprises a third option, wherein a first field of the third option corresponds to a characteristic information type, a second field of the third option corresponds to a length of the third option, a third field of the third option corresponds to the technical objective, and a fourth field of the third option corresponds to the information about the one or more characteristics of the third device supporting implementation of the technical objective.

10. The device according to claim 6, wherein the third response message comprises a fourth option, wherein a first field of the fourth option corresponds to a divert type, a second field of the fourth option corresponds to a length of the fourth option, a third field of the fourth option corresponds to the technical objective, and a fourth field of the fourth option corresponds to the information about one or more characteristics of a fifth device supporting implementation of the technical objective; and wherein the fourth option further comprises a fifth field for carrying identification information of the fifth device.

11. The method according to claim 1, wherein selecting the second device or the third device as the negotiation counterpart further comprises:

calculating, by the first device, a score for the second device based on the one or more characteristics of the second device and the one or more priorities associated with the one or more characteristics of the second device;

calculating, by the first device, a score for the third device based on the one or more characteristics of the third device and the one or more priorities associated with the one or more characteristics of the third device; and comparing the scores for the second and third devices.

12. The method according to claim 1, wherein selecting the second device or the third device as the negotiation counterpart further comprises:

comparing a highest-priority characteristic of the second device with a highest-priority characteristic of the third device.

13. The device according to claim 6, wherein selecting the second device or the third device as the negotiation counterpart further comprises:

calculating a score for the second device based on the one or more characteristics of the second device and the one or more priorities associated with the one or more characteristics of the second device; and calculating a score for the third device based on the one or more characteristics of the third device and the one or more priorities associated with the one or more characteristics of the third device.

14. The device according to claim 6, wherein selecting the second device or the third device as the negotiation counterpart further comprises:

comparing a highest-priority characteristic of the second device with a highest-priority characteristic of the third device.

15. A non-transitory computer-readable storage medium including processor-executable instructions stored thereon for selecting a negotiation counterpart, wherein the processor-executable instructions, when executed, facilitate:

sending a discovery message to at least two devices in the network, wherein the discovery message comprises a technical objective, and the discovery message is for finding a device supporting the technical objective, wherein the technical objective indicates a purpose of a first device sending the discovery message;

receiving a first response message from a second device in response to the discovery message, wherein the first response message comprises information about one or more characteristics of the second device supporting implementation of the technical objective, wherein each of the one or more characteristics of the second device is associated with a priority, and wherein the information about the one or more characteristics of the second device reflects a degree to which the second device supports the technical objective;

receiving a second response message from a third device in response to the discovery message, wherein the second response message comprises information about one or more characteristics of the third device supporting implementation of the technical objective, wherein each of the one or more characteristics of the third device is associated with a priority, and wherein the information about the one or more characteristics of the third device reflects a degree to which the third device supports the technical objective; and selecting the second device or the third device as a negotiation counterpart based on the one or more characteristics of the second device, one or more priorities associated with the one or more characteristics of the second device, the degree to which the second device supports the technical objective, the one or more characteristics of the third device, one or more priorities associated with the one or more characteristics of the third device, and the degree to which the third device supports the technical objective.

16. The non-transitory computer-readable storage medium according to claim 15, wherein the discovery message comprises a first option, wherein a first field of the first option corresponds a technical objective type, a second field of the first option corresponds to a length of the first option, and a third field of the first option corresponds to the technical objective.

17. The non-transitory computer-readable storage medium according to claim 15, wherein the discovery message comprises a first option, wherein a first field of the first option corresponds to a characteristic type, a second field of the first option corresponds to a length of the first option, a third field of the first option corresponds to the technical objective, and a fourth field of the first option corresponds to one or more characteristics supporting implementation of the technical objective.

18. The non-transitory computer-readable storage medium according to claim 15, wherein the first response message comprises a second option, wherein a first field of the second option corresponds to a characteristic information type, a second field of the second option corresponds to a length of the second option, a third field of the second option corresponds to the technical objective, and a fourth field of the second option corresponds to the information about the one or more characteristics of the second device supporting implementation of the technical objective; and wherein the second response message comprises a third option, wherein a first field of the third option corresponds to a characteristic information type, a second field of the third option corresponds to a length of the third option, a third field of the third option corresponds to the technical objective, and a fourth field of the third option corresponds to the information about the one or more characteristics of the third device supporting implementation of the technical objective.

19. The non-transitory computer-readable storage medium according to claim 15, wherein selecting the second device or the third device as the negotiation counterpart further comprises:
 calculating a score for the second device based on the one or more characteristics of the second device and the one or more priorities associated with the one or more characteristics of the second device; and
 calculating a score for the third device based on the one or more characteristics of the third device and the one or more priorities associated with the one or more characteristics of the third device.

20. The non-transitory computer-readable storage medium according to claim 15, wherein selecting the second device or the third device as the negotiation counterpart further comprises:
 comparing a highest-priority characteristic of the second device with a highest-priority characteristic of the third device.

* * * * *

UNITED STATES PATENT AND TRADEMARK OFFICE
CERTIFICATE OF CORRECTION

PATENT NO. : 10,972,356 B2
APPLICATION NO. : 15/963692
DATED : April 6, 2021
INVENTOR(S) : Liu et al.

Page 1 of 1

It is certified that error appears in the above-identified patent and that said Letters Patent is hereby corrected as shown below:

On the Title Page

Page 2, item (56) Other Publications, Citation 6: "Extensions to Session Traversal Utilities for NAT (STUN)," Intemet" should read -- Extensions to Session Traversal Utilities for NAT (STUN)," Internet --.

Signed and Sealed this
Fifth Day of April, 2022

Drew Hirshfeld
*Performing the Functions and Duties of the
Under Secretary of Commerce for Intellectual Property and
Director of the United States Patent and Trademark Office*